United States Patent [19]

Naaijer

[11] 4,238,820
[45] Dec. 9, 1980

[54] VARIABLE WAVE-FORM CONVERTER

[75] Inventor: Geert J. Naaijer, Limeil-Brevannes, France

[73] Assignee: U.S. Philips Corporation, New York, N.Y.

[21] Appl. No.: 16,676

[22] Filed: Mar. 1, 1979

[30] Foreign Application Priority Data

Mar. 2, 1978 [FR] France .................. 78 05979

[51] Int. Cl.³ .......................... H02M 7/537
[52] U.S. Cl. ........................ 363/43; 363/136
[58] Field of Search ........... 363/40, 43, 96, 135–136; 307/106–107, 43, 61, 63

[56] References Cited

U.S. PATENT DOCUMENTS

| | | | |
|---|---|---|---|
| 3,100,851 | 8/1963 | Ross et al. | 363/43 |
| 3,418,560 | 12/1968 | Petersen | 363/63 |
| 3,867,643 | 2/1975 | Baker et al. | 363/43 X |
| 4,135,235 | 1/1979 | Baker | 363/43 |
| 4,137,570 | 1/1979 | Baker | 363/43 |

*Primary Examiner*—J. D. Miller
*Assistant Examiner*—Peter S. Wong
*Attorney, Agent, or Firm*—Thomas A. Briody; William J. Streeter; Bernard Franzblau

[57] ABSTRACT

A d.c./a.c. converter synthesizes an alternating voltage by suitably and at the correct instants selectively combining a plurality of direct voltage sources into a variety of series connections by means of a plurality of semiconductor controlled switches and diodes. Polarity inversion is effected with a bridge circuit comprising switches. The converter load is connected to said bridge circuit. In this way it is possible to directly generate a 220 V, 50 Hz AC voltage without inductive elements, from solar panels, using accumulator batteries.

12 Claims, 6 Drawing Figures

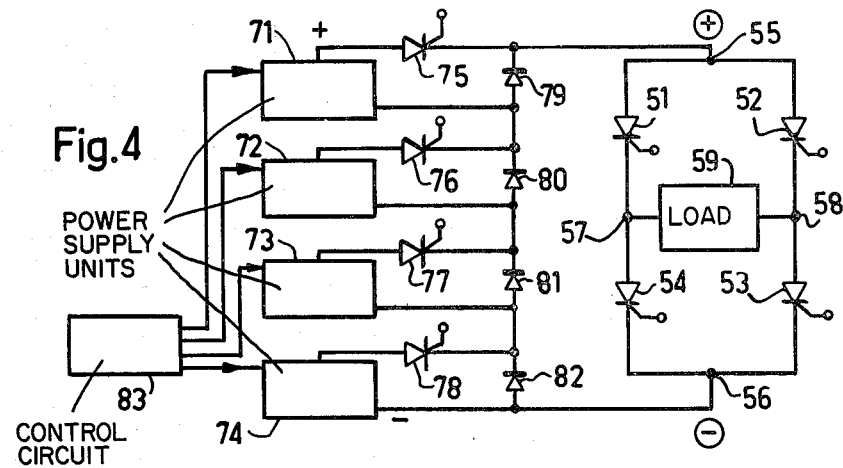
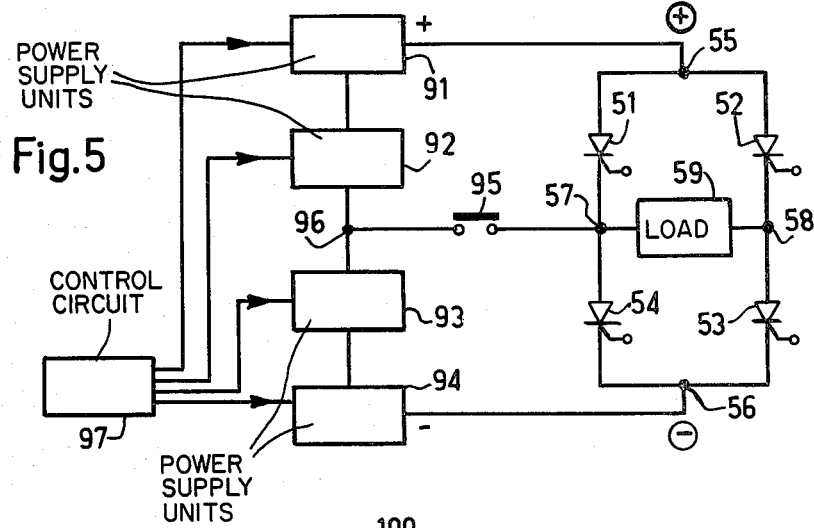
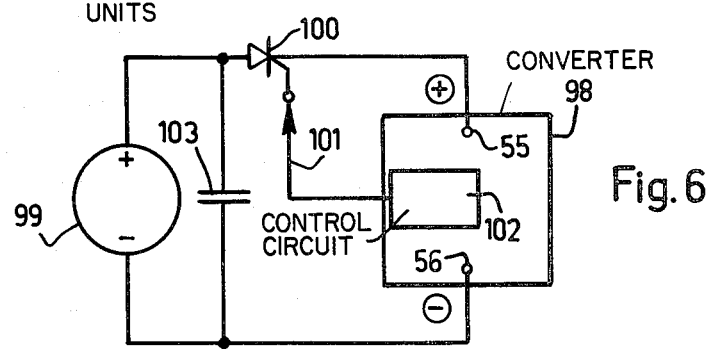

VARIABLE WAVE-FORM CONVERTER

The invention relates to a converter comprising a power supply unit and a control circuit, the power supply unit comprising n direct voltage sources, which when connected in series supply a voltage which is substantially equal to the peak value of an alternating voltage generated by the converter, with an interconnection device which comprises a multiple of n switches for combining the direct voltage sources so as to obtain a desired instantaneous alternating voltage amplitude, the control circuit opening and closing the switches in a sequence which depends on the desired waveform of the alternating voltage.

Such a converter is particularly suitable for generating alternating voltages similar to those supplied by the electric supply lines. The invention also relates to multiphase converters constructed by means of an arbitrary number of single-phase converters in accordance with the invention.

A particularly interesting use of the invention is the generation of a single-phase standard alternating voltage, i.e., one having an r.m.s. value of 110 or 220 V and a frequency of 50 Hz, by means of photocells or solar cell arrays, each array being connected to a direct voltage storage element such as one or more lead accumulator batteries, or by means of solar panels. The use of solar energy being one of the solutions considered in order to solve the energy problem, the use of a device as simple as that proposed by the invention may contribute to success in this respect.

A converter of the type mentioned in the preamble is known from U.S. Pat. No. 3,867,643. Each direct voltage source is included in a bridge circuit composed of four switches and the bridge circuits are connected in series so as to form a power supply unit, to which a load may be connected. By controlling each switch in each bridge circuit it is possible to obtain a series connection with one polarity, a series connection with the other polarity as well as to by-pass the direct voltage sources. In this way it is, for example, possible to generate a sinewave voltage.

It is an object of the invention to simplify such a circuit substantially and to this end the invention is characterized in that the interconnection device comprises n diodes and n switches and that in the power supply unit the diodes with the same forward direction are arranged in series so as to obtain a first series connection, and each source in series with one of the switches is included across the terminals of each diode output terminals of the power supply unit are respectively constituted by the anode of the first diode and the cathode of the last diode in the series connection. Furthermore the converter is provided with a bridge circuit comprising at least four switches for reversing the polarity, one diagonal of said bridge circuit being connected to the output terminals of the power supply unit and the other diagonal constituting the output terminals for connecting a load to the converter. The switches of the bridge circuit are opened and closed two by two by the control circuit so as to obtain the correct positive and negative polarity of the desired alternating voltage across the load terminals.

In this respect it is advantageous that the number of 4n switches in the known converter is reduced to only n+4 in the converter in accordance with the invention. This yields a substantial reduction in cost. Moreover, there is the further advantage that the control device and the wiring of the converter are greatly simplified.

The alternating voltage (having n steps per halfcycle) which is synthesized by means of this converter is an excellent approximation of the sinewave voltage obtained from the AC supply if the sequence and pattern of the control signals for opening and closing the switches are controlled in a suitable manner. This voltage is obtained with the aid of a single converter, but may nevertheless have an arbitrary r.m.s. value (by accordingly changing the number of sources that can be connected in series) as well as an arbitrary frequency (by suitably controlling the sequencing pattern of the control signals). Therefore, this converter has a very wide range of applications both in the domestic and the industrial field.

A second embodiment of the invention is characterized in that the power supply unit comprises a second series connection of (n−1) diodes which allow current to pass in the same direction as the first series connection, each diode also, being connected across the series connection of a switch and a source.

In this respect it is advantageous that as long as a source is not connected in series with other sources by a switch, said source be connected in parallel with the other sources by the diodes, so that all sources remain operative either in series or in parallel arrangement. In accordance with the said U.S. Patent the sources are used in series arrangement only and are by-passed and thus disconnected when their voltage is not needed in order to obtain the correct alternating voltage amplitude.

In a third embodiment the converter may comprise an arbitrary number of power supply units which are connected in series so as to supply the sum of their output voltages to the polarity inverting circuit. Each power supply unit is associated with a switch, which is connected in series therewith, and a diode which is connected in parallel with the series connection of the power supply unit and the associated switch, said diodes all being connected so as to allow current to pass through in the same direction as it flows through each power supply unit. The power supply sections, which each comprise a combination of a power supply unit, a switch and a diode, are connected in series so as to supply the sum of their individual output voltages to the polarity inverting circuit.

According to the invention this embodiment is characterized in that each power supply unit is constructed in a similar way to the power supply unit described in the foregoing.

The advantage of such an arrangement is that the efficiency of the converter is improved because the series connection of all diodes in a power supply unit which functions as a direct voltage source is replaced by one diode when said source is disconnected. The load current then passes through one diode only instead of through the entire series connection.

A fourth embodiment of the converter in accordance with the invention comprises at least two power supply units in series and with a center tapping, therebetween. A switch connects the center tapping to one of the converter output terminals. When the switch is closed the control circuit keeps open the two switches of the bridge circuit which are connected to the said one connecter output terminal. The control circuit also controls the power supply units so that the power supply section between the center tapping and one output terminal of one power supply unit provides the positive halfcycle of the alternating voltage and the power supply section between the center tapping and an output terminal of a second power supply unit provides the negative halfcycle.

Thus, the converter may simply be used for two voltages, e.g. 110 and 220 V. If the said switch is replaced by a permanent connection, the said switches of the bridge circuit may also be dispensed with and a half bridge will suffice for the polarity inversion.

The direct voltage sources, as included in the power supply units and combined in accordance with a specific timing pattern by the control circuit so as to generate the instantaneous alternating voltage amplitude, may be of the primary type and thus convert chemical, thermal or photo-energy into electrical energy. Alternatively they may be of the secondary type, in which case they have to be charged constantly. Examples of this are accumulator batteries or capacitors. These last-mentioned sources may then each be charged by a source of the primary type, such as an array of solar cells or a solar panel, via a charging circuit. On the other hand, it is possible to use one central generator which supplies a direct voltage slightly higher than the peak value of the alternating voltage from the converter. This generator is only connected to the output terminals of the power supply unit during the time interval that all direct voltage sources in the power supply unit are connected in series. In that case the switches used in the power supply unit should be of the bilateral current-carrying type, such as a mechanical contact or a triac. If a transistor or a thyristor is used as the switch, a diode for transferring the charging current should be included across each switch.

A converter in this embodiment is characterized in that the direct voltage sources comprise accumulator batteries and that a charging device with a generator is connectable across the output terminals of the power supply unit via a switch, said switch being closed under command of the control circuit so as to transfer a charging current only during the time interval that all sources in the power supply unit are connected in series.

A multi-phase converter can be obtained by combining a plurality of single-phase converters as described so far and appropriately synchronising the control circuits.

The embodiments described produce a sine-wave voltage by the consecutive addition and cancellation of voltage steps. A Fourier-analysis reveals that the alternating voltage generated by the converter in accordance with the invention comprises no even harmonics and that the amplitude of the odd harmonics rapidly decreases as the number of voltage steps that are correctly situated in conformity with the sinewave to be formed increases. Thus, it is then superfluous to filter the output voltage of the converter. However, owing to switching times, diode knee voltages etc. odd and even harmonics of such a residual amplitude are left that a simple filtration is still recommended.

It is noted that the converter of the novel type proposed here includes neither a transformer nor inductances in the power circuit. Owing to the absence of inductive circuits the losses normally associated with such elements are avoided, while satisfactory efficiencies and a negligible no-load consumption can be obtained.

The invention will be described in more detail with reference to the accompanying drawing in which:

FIG. 4 shows a second embodiment of the converter;

FIG. 5 shows a third embodiment of the converter, and

FIG. 6 shows a variant which includes a charging device for the accumulator batteries employed in the converter.

Figure 1:
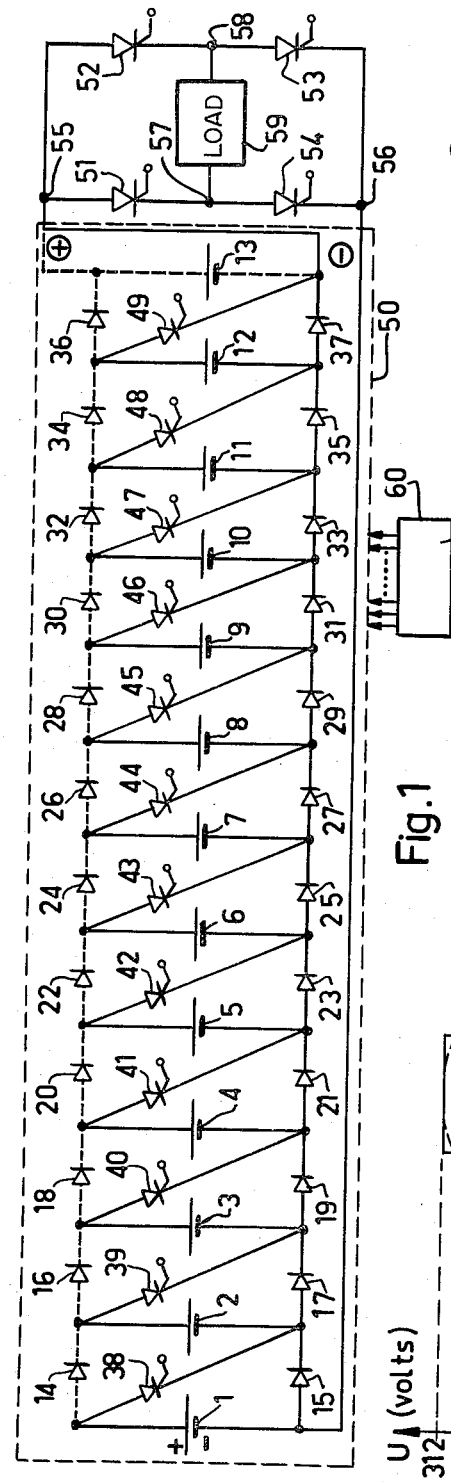
FIG. 1 shows a first embodiment of the converter in accordance with the invention which is adapted for the use of solar energy.
Figure 2:
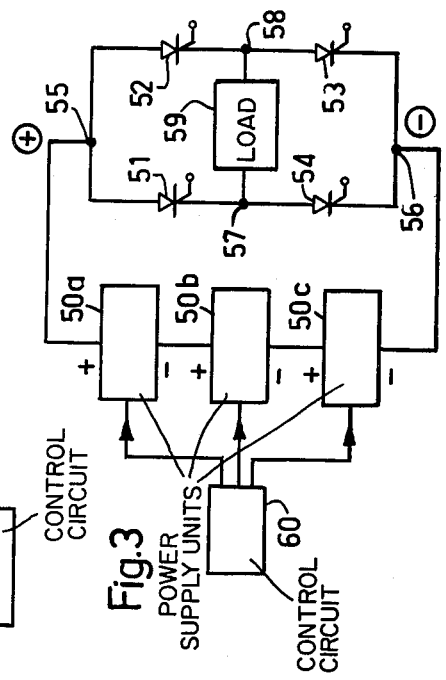
FIG. 2 shows a voltage waveform which can be obtained with the aid of the converter of FIG. 1.

A first embodiment of the single-phase converter described with reference to FIGS. 1 and 2 is adapted to generate a sinewave voltage with an amplitude of 312 V, an r.m.s. value of 220 V and a frequency of 50 Hz. These values are given by way of example because they correspond to the values used for some electric supply lines, but any other combination of values is possible owing to the versatility of the converter in accordance with the invention.

In the present embodiment the converter comprises thirteen lead accumulator batteries 1 through 13, which are respectively connected to arrays which each comprise an equal number of photo cells (for the sake of simplicity these arrays are not shown in FIG. 1). Each accumulator batter can supply a voltage of 24 V. The converter also comprises twenty-four diodes 14 to 37 and twelve switches, in the present example constituted by thyristors 38 to 49, though they may be also constituted by triacs. The diodes 14 to 37 are each included between two consecutive batteries, for example diodes 14 and 15 between the batteries 1 and 2, diodes 16 and 17 between the batteries 2 and 3 and so on. The twentyfour diodes are all connected in the same direction so that the diodes with even reference numerals establish a first connection between the thirteen positive terminals of the batteries and the diodes with odd reference numerals a second connection between the thirteen negative terminals. The thyristors 38 to 49 are each included between the positive terminal of a battery and the negative terminal of the next battery (reckoned in the direction of increasing reference numerals). The combination of the thirteen batteries 1 to 13, the twenty-four diodes 14 to 37 and the twelve thyristors 38 to 49 constitutes a power supply unit 50 which is adapted to supply a voltage of a specific polarity between the negative terminal of the first battery 1 and the positive terminal of the last battery 13.

The converter described also includes a polarity inverting circuit comprising four thyristors 51 to 54 which are pairwise connected in series in two parallel branches. Across the input terminals 55 and 56 of this circuit the positive voltage supplied by the power supply unit 50 is available and across the intermediate terminals 57 and 58 said voltage is available alternately with one polarity or with the opposite polarity, depending on which of the thyristors 51 to 54 are turned on or turned off. Between the terminals 57 and 58 a circuit 59 is connected which is to be energized by the converter in accordance with the invention and which is referred to hereinafter by the general term "load".

Finally, the converter comprises a control circuit 60 for supplying control signals to the thyristors 38 to 49 of the power supply unit 50 and the thyristors 51 to 54 of the polarity inverting circuit so as to open and close each of these switches in a sequence which depends on the waveform of the voltage to be generated.

In FIG. 1 the connecting lines of the diodes 14, 16, 18 to 36 and the source 13 are shown dashed. This is because the source 13 and the diode 36, if present, should be dispensed with if a null voltage is to be obtained from the power supply unit 50. Moreover, if the direct voltage sources 1 to 12 may not be connected in parallel via the diode circuits or if this parallel connection is not necessary or desirable, the diodes 14, 16, 18 to 34 and 36 may be dispensed with.

FIG. 2 shows the voltage waveform and illustrates how this voltage is formed by means of the converter described in the foregoing. Said control circuit 60, which is of a known type and which may be realised using analogue or digital technology, supplies positive or negative pulses to the thyristors so as to ensure that these thyristors are turned on or off at instants which have been selected in such a way that the addition or cancellation of the resultant voltage steps leads to an optimum approximation of the desired alternating voltage. The voltage with 13 steps, shown in FIG. 2, which has an amplitude of 312 V and a period of 20 msecs., is for example obtained with the aid of a train of control pulses, by means of which consecutively the following 14 states are obtained:
- t0 to t1: all thyristors off
- t1 to t2: thyristors 51 and 53 on
- t2 to t3: 51, 53, 38 on
- t3 to t4: 51, 53, 38, 39 on
- t4 to t5: 51, 53, 38, 39, 40 on etc. until eventually all thyristors 38 to 49 are turned on and all accumulator batteries are connected in series so as to obtain the maximum voltage:
- t12 to t13: 51, 53 and 38 to 48 turned-on
- t13 to t14: 51, 53 and 38 to 49 turned-on.

When the voltage of 312 V is reached the thyristors 38 to 49 are consecutively turned off in a sequence which is the reverse of their turn-on sequence. After all thyristors 38 to 49 and thyristors 51 and 53 have been turned off, the two other thyristors 52 and 54 are turned on and subsequently the thyristors 38 to 49 are turned on in the same sequence as described in the foregoing in order to form the negative half-cycle. By means of a common adjusting facility the entire process corresponding to two half-cycles can be made faster or slower so as to change the frequency of the voltage generated.

The aforementioned sequence of turning on and turning off the thyristors is merely an example of a sequence which may be selected for realizing the consecutive addition and cancellation of voltage steps. Furthermore, it is to be noted that during said turn-on and turn-off sequences the batteries 1 to 13 do not operate in an identical manner because at a given instant certain batteries are connected in series and other batteries are connected in parallel. This drawback may be mitigated by cyclically changing the turn-on and turn-off sequence after every half-cycle or after a number of half-cycles or by changing the sequence of it randomly rather than periodically. The only requirement to be observed is that for the formation of each half-cycle said sequence enables the same build-up and subsequently the same decay (or combination) of voltage steps to be obtained. In this way each battery is on the average subject to the same load (as the case may be over a large number of periods). Such a step is equally applicable to the converter just described and to the variants described hereinafter.

Figure 3:
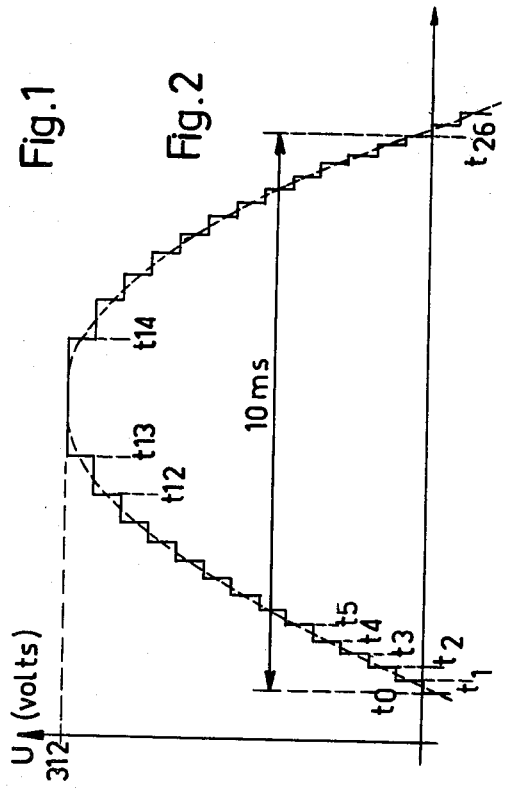
FIG. 3 shows a variant of the converter of FIG. 1.

If the voltage to be generated has an amplitude which is higher than that chosen in the previous example, a converter may be used, as is shown in FIG. 3, which comprises several supply units 50a to 50c, which are identical to the unit 50, and which are connected in series so as to supply the sum of their individual output voltages to the polarity inverting circuit.

In a different embodiment, shown in FIG. 4, the converter in accordance with the invention comprises four power supply units 71 to 74 which are identical to the unit 50 of the converter of FIG. 1 (or to the units 50a to 50c). Each of these units 71 to 74 has an associated thyristor 75 to 78 respectively, connected in series therewith. Each of these four series connections in its turn has an associated diode 79 to 82 respectively, which is connected in parallel with said series connection. The four diodes are all connected so as to pass current in the same direction as the direction in which the current flows in each power supply unit 71 to 74. The combination of a power supply unit, a thyristor and a diode constitutes a power supply section (71, 75, 79), (72, 76, 80), (73, 77, 81) or (74, 78, 82). These four power supply sections are connected in series so as to supply the sum of their individual output voltages to the polarity inverting circuit. As described in the foregoing, an adjustable control circuit 83 enables a free choice of the sequence of pulses for turning on and off the thyristors so as to switch the power supply sections into or out of the circuit which supplies the load and so as to ensure that in each power supply section the relevant batteries are connected in series or in parallel. The diodes 79 to 82 ensure that the passage of current continues when the relevant power supply section is disconnected (i.e. when the thyristor connected in series with said section is turned off). Assuming that each power supply section comprises thirteen batteries, the embodiment just described enables a voltage to be generated, which comprises 52 steps between the zero value and the peak value, i.e. which enables a voltage to be synthesized in excellent approximation. Even if a thyristor should not be turned on and a step is missing in the voltage generated, this will not significantly affect the quality of the voltage.

in a third embodiment shown in FIG. 5 the converter in accordance with the invention comprises an even number of 2 m power supply sections identical to those just defined. In the present example an arbitrary number of four sections (m=2) has been chosen, but this number may be selected higher if a better waveform is required. The four power supply sections are designated 91, 92, 93 and 94. An additional branch provided with a switch 95 connects the intermediate terminal 57 of one of the parallel branches of the polarity inverting circuit to the terminal 96, which is common to two power supply sections designated m and (M+1), i.e. to the terminal which is the center tapping of the 2 m power supply sections 91 to 94. In a similar manner to that described in the foregoing, an adjustable control circuit 97 enables the sequence of pulses to be selected for turning the thyristors on or off. In the present example this circuit 97 keeps the switch 95 permanently turned on and the thyristors 51 and 54 permanently turned off. In this embodiment of the converter, in which the polarity inverting circuit is a circuit with a center tapping, the converter never comprises more than m power supply sections which simultaneously contribute to the formation of the voltage, which in the present example, in which m=2, may be the power supply sections 91 and 92 or the power supply sections 93 and 94.

In the embodiments described so far the units or power supply sections included batteries which, in order to be charged, were each connected to arrays of a given number of photo cells, so-called solar cells. However, the invention by no means depends on the manner in which the batteries are charged or on the form of energy used. As is shown in FIG. 6, the electrical energy can be stored with the aid of a charging circuit which is connected between the terminals 55 and 56 of the converter (designated 98 in said Figure). This charging circuit comprises a single generator 99 which is capable of supplying a direct voltage which is at least equal to the peak value of the voltage to be generated (a wind-driven generator, a generator which is driven hydraulically or by thermo-dynamic systems, or any other device which converts an arbitrary form of energy into a direct voltage), a thyristor 100, a control line 101 which connects the control circuit 102 of the converter 98 to the thyristor 100, and a capacitor 103. The thyristor 100 ensures that the charging circuit of the batteries is periodically closed. This closure is effected during the comparatively long interval, which corresponds to the peaks of the positive and negative half-cycles of the generated voltage, when all the batteries are connected in series. Diodes, not shown, are then connected in a suitable direction across the terminals of all thyristors of the power supply units or power supply sections so as to allow the passage of the charging current. The control circuit 102, as described previously, supplies pulses for turning the thyristors of the converter on or off and for periodically turning off the thyristor 100. The capacitor 103 is connected to the terminals of the generator 99 so as to store the electrical energy delivered by said generator when the thyristor 100 is turned off. The batteries may also be charged by connecting charging circuits other than those just described between the terminals 55 and 56 of the converter, which circuits are thus connected in parallel with each other. In this way the batteries are charged by charging currents from different sources.

Finally, an arbitrary number of single-phase converters in accordance with the invention may be combined so as to realise a multi-phase converter, i.e. a converter which supplies a multi-phase alternating voltage of adjustable amplitude and frequency, the number of phases depending on the number of converters included. Such multi-phase systems may be completely galvanically isolated or may have direct connections. The control circuits of each single-phase converter may be synchronized in a specific sequence so as to obtain the desired multi-phase voltage, or thus may be replaced by a single control circuit.

The converter in accordance with the invention for example enables the AC line voltage to be synthesized in excellent approximation. As a result of the favourable characteristics, i.e. the almost total absence of inductive elements which cause substantial losses and the possibility of synthesizing an arbitrary voltage (of arbitrary amplitude, frequency and number of phases), this converter provides an extremely flexible and comparatively economic solution to electrical power supply problems.

Obviously the present invention is not limited to the embodiments just described, from which other variants and embodiments may be derived without departing from the scope of the invention.

In order to protect the thyristors against excess voltages a diode may be connected across them which limits the inverse voltage of each thyristor. As stated previously, such diodes are absolutely necessary for the transistors or thyristors of the power supply units and power supply sections if the converter is connected to the generator 99 of the charging circuit of FIG. 6.

The polarity inverting device may also be used in conjunction with devices of a known type which prevent a thyristor which has just been turned on from being turned off erroneously by the switching transient of the thyristor. It is also possible to provide transistor instead of thyristor control, the state of conduction of said transistors then being controlled by voltage levels instead of by pulses.

The generated voltage may also be filtered with the aid of a low-pass filter. Moreover, between the output of the converter and the load a filter may be included which presents a capacitive load to the converter, even though said load is in reality inductive. As an example a so-called "Ott" filter may be used.

in the case of a converter with a polarity inverting circuit with a center tapping (FIG. 5) positive and negative half-cycles are formed with an equal number of steps. However, this may also be effected with a different number of steps. This will be the case if the two groups of m power supply sections used in this example are replaced by two groups of which one group comprises p sections which each supply q volts and the other group r sections which each supply s volts, so that $p \times q = r \times s$, which means that both half-cycles have the same peak value. It is obvious that the sequence of the control pulses should be adapted accordingly.

Furthermore, it is evident that by suitably selecting the pattern of the pulses which control the thyristors, and thus the addition of subtraction of the voltage steps, any alternating voltage waveform such as a square-wave, sinewave, or sawtooth, or any other wave, may be formed of arbitrary frequency.

What is claimed is:

1. A converter for generating an alternating voltage comprising, a power supply unit, the power supply unit comprising n direct voltage sources which when connected in series supply a voltage which is substantially equal to the peak value of said alternating voltage, an interconnection device which comprises a plurality of n switches for selectively combining the direct voltage sources so as to obtain a desired instantaneous alternating voltage amplitude, wherein n is an integer, the converter further comprising a control circuit coupled to the switches for opening and closing the switches in a sequence which depends on the desired waveform of the alternating voltage, the interconnection device further comprising n diodes connected in series in the same forward direction so as to derive a first series connection, means connecting each voltage source in series with one of the switches across the terminals of a respective diode, the power supply unit having output terminals respectively constituted by the anode of the first diode and the cathode of the last diode in the series connection, the converter further comprising a bridge circuit including at least four switches for reversing the polarity, means connecting one diagonal of said bridge circuit to the output terminals of the power supply unit and the other diagonal to terminals for a load to be connected to the converter, and the polarity reversing switches being opened and closed two by two by the control circuit so as to obtain the correct positive and negative polarity of the desired alternating voltage across the load terminals.

2. A converter as claimed in claim 1 wherein the power supply unit further comprises a second series connection of (n−1) diodes connected so as to allow current to pass in the same direction as the first series connection and with each diode of the second series connection also connected across the series connection of a switch and a voltage source.

3. A converter as claimed in claim 1 comprising a plurality of power supply units each as claimed in claim 1 or claim 2, a plurality of switches and diodes each equal in number to the number of power supply units, means connecting the diodes in series and with the same polarity, means connecting each power supply unit in series with a respective one of said switches across the terminals of a respective one of said diodes, and means connecting the one diagonal of a bridge circuit as claimed in claim 1 across the series connection of diodes.

4. A converter as claimed in claims 1 or 2 wherein the switches of the interconnection device effectively comprise single pole switches.

5. A converter comprising first and second power supply units each as claimed in claims 1 or 2, means coupling the first and second power supply units in series to form a center tapping therebetween, a switch for connecting the center tapping to one of the output terminals of the converter so that when said switch is closed the control circuit keeps open the two switches of the bridge circuit which are connected to the said output terminal, the control circuit further controlling the power supply units so that a power supply section between the center tapping and one output terminal of the first power supply unit provides the positive half-cycle of the alternating voltge and a power supply section between the center tapping and an output terminal of the second power supply unit provides the negative half-cycle thereof.

6. A converter as claimed in claims 1 or 2 wherein the direct voltage sources comprise accumulator batteries, and a charging device including a generator connectable across the output terminals of the power supply unit via a switch, said switch being closed under command of the control circuit so as to transfer a charging current to the output terminals only during the time interval that all sources in the power supply unit are connected in series.

7. A waveform generator comprising, a power supply unit, the power supply unit comprising a plurality of DC voltage sources, a plurality of controlled switches each having a control terminal, a plurality of diodes connected in series aiding configuration including a first diode and a last diode of the series configuration, a pair of output terminals respectively coupled to said first and last diodes, means connecting each DC voltage source in series with a respective one of said switches across the terminals of a respective one of said diodes, the waveform generator further comprising a control circuit coupled to the control terminals of the controlled switches for operating said switches in a sequence determined by the voltage waveform to be generated at said output terminals, and means coupling said output terminals to the terminals of a load circuit.

8. A waveform generator as claimed in claim 7 wherein said DC voltage sources are polarized so that operation of two or more controlled switches couples the associated two or more DC voltage sources in series aiding configuration to the output terminals.

9. A waveform generator as claimed in claims 7 or 8 wherein said controlled switches comprise unidirectional current flow semiconductor devices and each said diode with its associated DC voltage source and semiconductor switch serially connected across its terminals form a closed loop circuit with the diode and semiconductor switch connected in series opposition relative to the terminals of the associated DC voltage source.

10. A waveform generator as claimed in claims 7 or 8 wherein said coupling means comprises polarity reversing switching means controlled by said control circuit to reverse the polarity of the waveform voltage coupled from said output terminals to said load circuit terminals thereby to produce an alternating voltage waveform across the load circuit.

11. A waveform generator as claimed in claims 7 or 8 wherein the power supply unit comprises a second plurality of diodes connected in series aiding configuration and coupled to said output terminals and to respective ones of said DC voltage sources and controlled switches so that each respective DC voltage source and controlled switch is connected in series across the terminals of a respective one of said second plurality of diodes.

12. A waveform generator as claimed in claim 7 or 8 and further comprising a second power supply unit as recited in claims 7 or 8 coupled to said control circuit, and said coupling means comprises, a first diode and a first unidirectional controlled switch connected in series opposition across the output terminals of the first power supply unit, a second diode and a second unidirectional controlled switch connected in series opposition across the output terminals of the second power supply unit, and means connecting said first and second diodes in series aiding configuration to the terminals of the load circuit.

* * * * *

UNITED STATES PATENT AND TRADEMARK OFFICE
CERTIFICATE OF CORRECTION

PATENT NO. : 4,238,820

DATED : December 9, 1980

INVENTOR(S) : GEERT J. NAAIJER

It is certified that error appears in the above—identified patent and that said Letters Patent is hereby corrected as shown below:

Column 5 line 8 "34 and 36" should be --34 or 36--

Column 6 line 45 "in a" should be --In a--

Column 8 line 22 "in" should be --In--

Signed and Sealed this

Twenty-sixth Day of October 1982

[SEAL]

Attest:

GERALD J. MOSSINGHOFF

Attesting Officer     Commissioner of Patents and Trademarks